US011262209B2

(12) United States Patent
Zhang et al.

(10) Patent No.: US 11,262,209 B2
(45) Date of Patent: Mar. 1, 2022

(54) METHODS AND SYSTEMS FOR ROAD WORK EXTENSION IDENTIFICATION

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 426 days.

(21) Appl. No.: 16/217,842

(22) Filed: Dec. 12, 2018

(65) Prior Publication Data
US 2020/0191602 A1  Jun. 18, 2020

(51) Int. Cl.
| | |
|---|---|
| *G01C 21/36* | (2006.01) |
| *G01C 21/30* | (2006.01) |
| *G08G 1/0962* | (2006.01) |
| *H04L 29/08* | (2006.01) |
| *G01C 21/00* | (2006.01) |
| *H04L 67/52* | (2022.01) |
| *H04L 67/12* | (2022.01) |

(52) U.S. Cl.
CPC ......... *G01C 21/3697* (2013.01); *G01C 21/30* (2013.01); *G01C 21/3602* (2013.01); *G08G 1/09623* (2013.01); *G01C 21/3691* (2013.01); *G01C 21/3815* (2020.08); *H04L 67/12* (2013.01); *H04L 67/18* (2013.01)

(58) Field of Classification Search
CPC .......... G01C 21/3697; G01C 21/3602; G01C 21/30; G01C 21/3815; G01C 21/3691; G08G 1/09623; H04L 67/18; H04L 67/12
See application file for complete search history.

(56) References Cited

U.S. PATENT DOCUMENTS 8,825,259 B1 *  9/2014  Ferguson .............. G01S 13/865
                                                                701/23
9,626,571 B2    4/2017  Spangenberg
                          (Continued)

FOREIGN PATENT DOCUMENTS

| FR | 3061886 A1 | 7/2018 |
| WO | 2011157251 A1 | 12/2011 |
| WO | 2017144319 A1 | 8/2017 |

OTHER PUBLICATIONS

Abramov et al., "A Flexible Modeling Approach for Robust Multi-lane Road Estimation", Jun. 6, 2017, 7 pages.

*Primary Examiner* — Dale W Hilgendorf
(74) *Attorney, Agent, or Firm* — Ditthavong, Steiner & Mlotkowski

(57) ABSTRACT

A method, a system, and a computer program for identification of at least one road work extension in a geographical location are provided. The method includes, for example, the process of building and accessing a map for the geographic location curated with the marking of one or more road work zones corresponding to the at least one road work extensions. To calculate road work extension, the method includes obtaining a plurality of lane markings on a road work link and determine a start and an end offset of at least one link using obtained lane marking observations. Further, the method includes generating the road work extension data comprising co-ordinates of each of the start position and the end position of the road work extension, based on the determined link start offset and the link end offset.

17 Claims, 8 Drawing Sheets

(56) References Cited

U.S. PATENT DOCUMENTS

| | | | |
|---|---|---|---|
| 2007/0038365 A1* | 2/2007 | An | G01C 21/30 |
| | | | 701/532 |
| 2010/0179755 A1* | 7/2010 | Kohno et al. | G01C 21/36 |
| | | | 701/532 |
| 2011/0222732 A1* | 9/2011 | Higuchi | B60W 30/18145 |
| | | | 382/104 |
| 2011/0238294 A1* | 9/2011 | Shikimachi et al. | G01C 21/34 |
| | | | 701/533 |
| 2014/0067187 A1* | 3/2014 | Ferguson et al. | B60W 30/12 |
| | | | 701/28 |
| 2016/0046290 A1* | 2/2016 | Aharony | B60W 10/20 |
| | | | 701/41 |
| 2017/0010115 A1 | 1/2017 | Stein et al. | |
| 2017/0016731 A1* | 1/2017 | Koshiba | G01C 21/30 |
| 2018/0149487 A1* | 5/2018 | Lee | G01C 21/005 |
| 2018/0194363 A1* | 7/2018 | Sugiura | G01C 21/3602 |
| 2018/0245938 A1* | 8/2018 | Song | G01C 21/3407 |
| 2020/0080862 A1* | 3/2020 | Pluciennik | G01C 21/3632 |
| 2021/0163066 A1* | 6/2021 | Kamiya et al. | B60W 30/12 |

\* cited by examiner

METHODS AND SYSTEMS FOR ROAD WORK EXTENSION IDENTIFICATION

TECHNOLOGICAL FIELD

The present disclosure generally relates to navigation technology, and more particularly to a system, method and computer program of identification of roadwork extensions.

BACKGROUND

Roadwork or road reconstruction is a very inconvenient process in itself for obvious reasons. The roadwork, in an example, may include, road surface repairs, work on power lines, water works, etc. Sometimes, the roadwork causes disablement of the entire lane temporarily which may cause delays and increased travel time for travelers. Also, the roadwork zone or the lane undergoing repair may require skillful and slow drivers as the lane condition is not at its best. Roadwork zones may also be found when a major accident occurs and road debris from the accident needs to be cleared, in such cases the roadwork may necessitate the travelers to take a detour via a longer possible route that consumes more time and energy of the travelers.

Presently, the roadwork zones are indicated to the travelers or the autonomous vehicles using road signs, such as, "men at work" sign, "roadwork ahead" sign etc., or temporary signs such as traffic cones, barrier boards, etc. In Western European countries, such as Germany, the roadwork zones are indicated to the travelers or autonomous vehicles using yellow lane markings from a distance of the roadwork zone. However, it might not be possible to clearly identify lane marking start and end by the travelers as well as the autonomous vehicles when the vehicles are moving at higher speeds. Moreover, for autonomous vehicles identifying such markings well in advance may be important to avoid collisions and undue mishaps.

BRIEF SUMMARY

A method, a system, and a computer program product are provided in accordance with an example embodiment described herein for determining road work extension data for identification of at least one road work extension. It is useful to identify the road work zones well in advance and plan the driving course or the driving speed. In the case of autonomous vehicles, there may be a requirement for transitioning from autonomous mode to manual driving mode, when the vehicle approaches a road work zone and hence, the prior identification of the roadwork zone allows the vehicle to decide the time of switch from autonomous driving mode to manual driving mode well in advance. Accordingly, there is a need for an intuitive solution that is capable of detecting the road work zone and providing the detected road work zones to the travelers through a user interface.

Embodiments of the disclosure provide a method for determining road work extension data for identification of at least one road work extension. The method comprises the step of obtaining a plurality of lane marking observations map-matched on a roadwork link, where each of the lane marking observations comprises a lane marking location. The method further comprises the steps of determining a link start offset and a link end offset based on a start offset and an end offset of the lane marking location of each of the plurality of lane marking observations, where the link start offset is associated with a start position of the road work extension and the link end offset is associated with an end position of the road work extension and generating the road work extension data comprising co-ordinates of each of the start position and the end position of the road work extension, based on the determined link start offset and the link end offset.

According to one embodiment of the disclosure, each of the plurality of lane marking observations further comprises a lane marking heading.

According to one embodiment of the disclosure, the roadwork link comprises a start node, an end node, and a plurality of shape points.

According to one embodiment of the disclosure, determining of the link start offset and the link end offset comprises the steps of selecting a target shape point from the plurality of shape points on the roadwork link based on a distance between the lane marking location of each of the plurality of lane marking observations and each of the plurality of shape points on the roadwork link and determining an on-route distance between the selected target shape point and the lane marking location of each of the plurality of lane marking observations.

According to one embodiment of the disclosure, the determining of the link start offset and the link end offset further comprises the steps of determining the start offset of the lane marking location of each of the plurality of lane marking observations based on the determined on-route distance and a location of the start node of the road work link, determining the end offset of the lane marking location of each of the plurality of lane marking observations based on the determined start offset and a location of the end node of the roadwork link and extracting the link start offset and the link end offset based on the determined start offset and the determined end offset of the lane marking location of each of the plurality of lane marking observations.

According to one embodiment of the disclosure, the generating of the road work extension data comprises the steps of searching for a pair of co-ordinates associated with the target shape point on the roadwork link and determining the co-ordinates of each of the link start offset and the link end offset based on a location of the target shape point and a location of a candidate shape point on the roadwork link in downstream of the target shape point.

According to one embodiment of the disclosure, the co-ordinates of each of the start position and the end position of the road work extension correspond to a longitudinal component and a latitudinal component associated with a location of the road work extension.

Embodiments of the disclosure provide a system for determining road work extension data for identification of at least one road work extension. The system comprises of at least one memory configured to store computer program code instructions and at least one processor configured to execute the computer program code instructions to carry out a method for determining road work extension data for identification of at least work extension. The method comprises the step of obtaining a plurality of lane marking observations map-matched on a roadwork link, where each of the lane marking observations comprises a lane marking location. The method further comprises the steps of determining a link start offset and a link end offset based on a start offset and an end offset of the lane marking location of each of the plurality of lane marking observations, where the link start offset is associated with a start position of the road work extension and the link end offset is associated with an end position of the road work extension and generating the road work extension data comprising co-ordinates of each of the start position and the end position of the road work extension, based on the determined link start offset and the link end offset.

Embodiments of the disclosure provide a computer program product comprising at least one non-transitory computer-readable storage medium having stored thereon computer-executable program code instructions which when executed by a computer, cause the computer to carry out operations for determining road work extension data for identification of at least one road work extension, the operations comprises the step of obtaining a plurality of lane marking observations map-matched on a roadwork link, where each of the lane marking observations comprises a lane marking location. Further, the operations comprises the steps of determining a link start offset and a link end offset based on a start offset and an end offset of the lane marking location of each of the plurality of lane marking observations, where the link start offset is associated with a start position of the road work extension and the link end offset is associated with an end position of the road work extension and generating the road work extension data comprising co-ordinates of each of the start position and the end position of the road work extension, based on the determined link start offset and the link end offset.

BRIEF DESCRIPTION OF THE DRAWINGS

Figure 1:
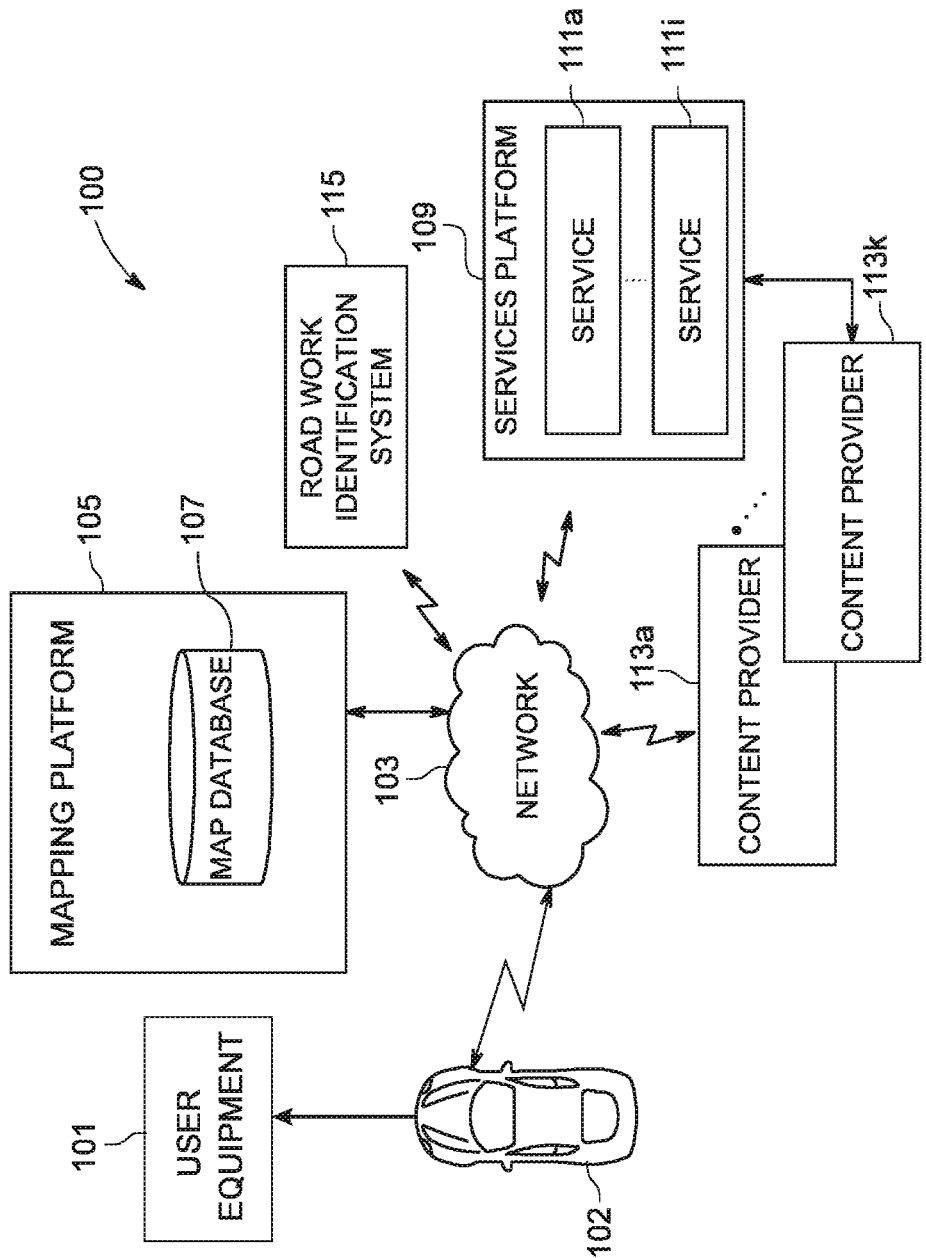
Figure 2:
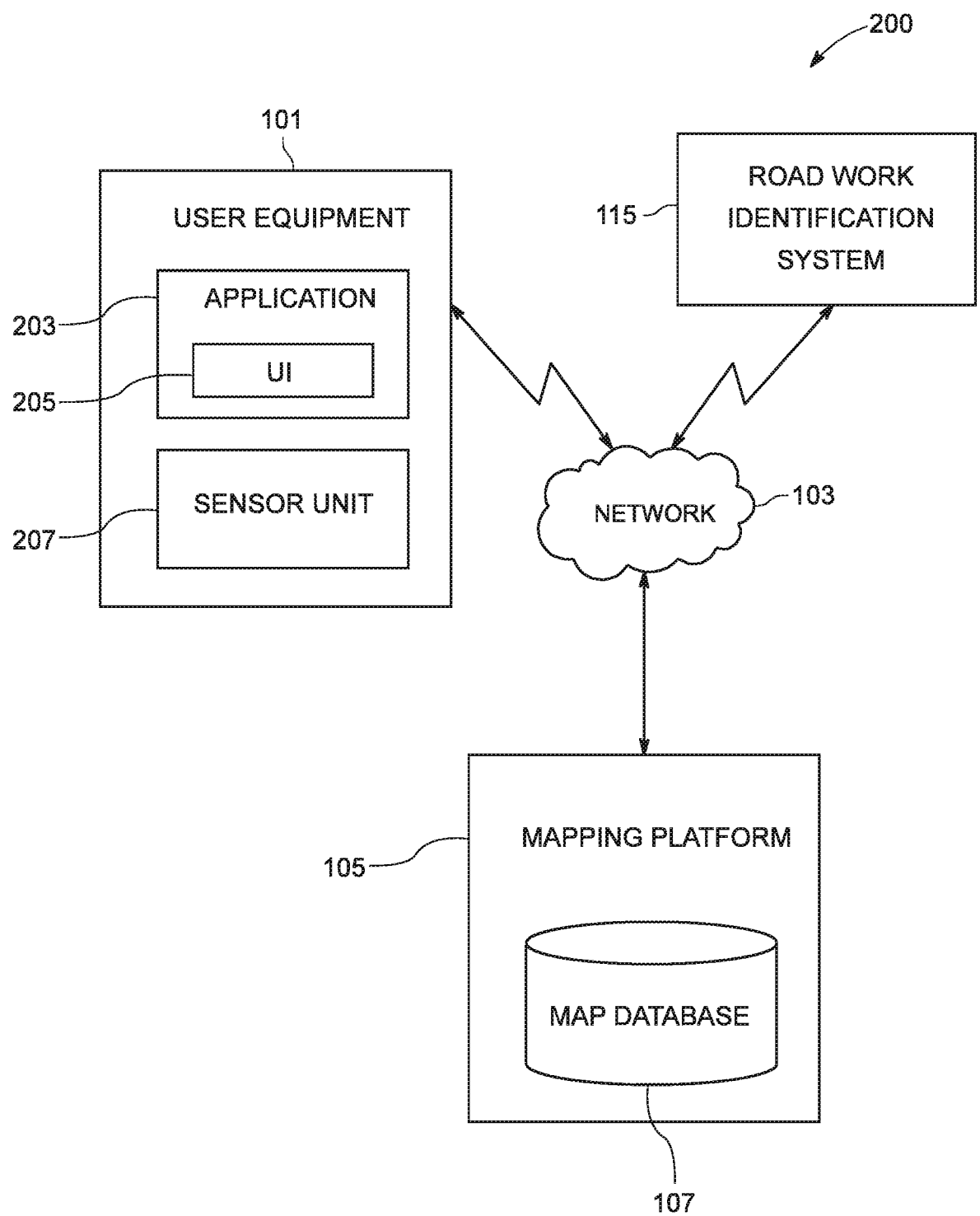
Figure 3:
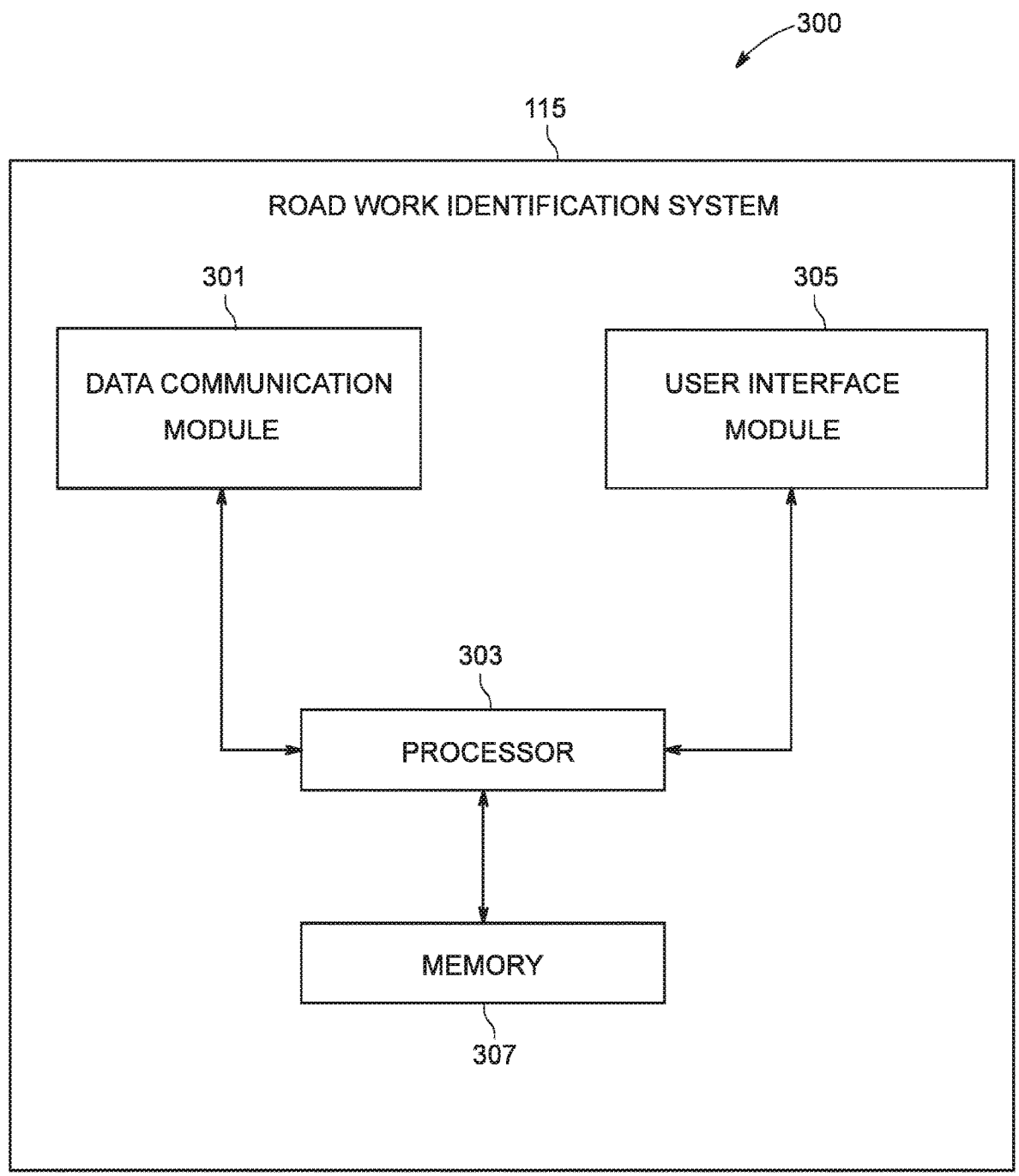
Figure 4:
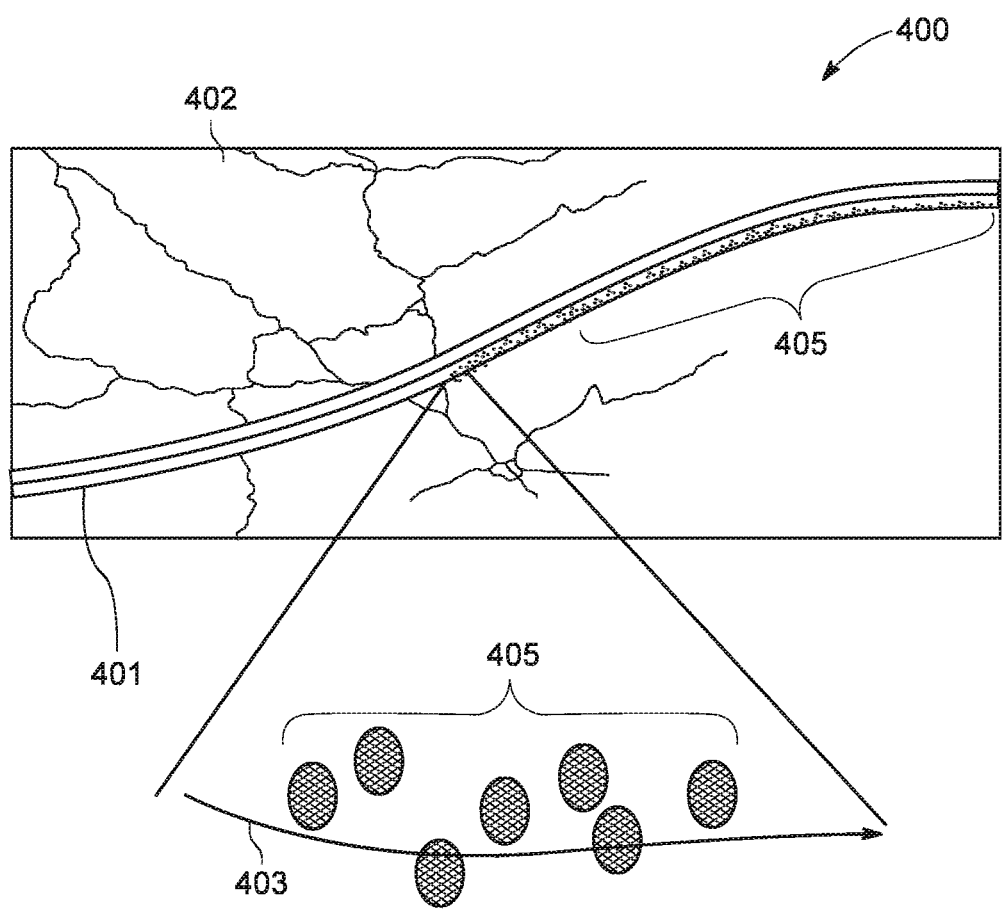
Figure 5A:
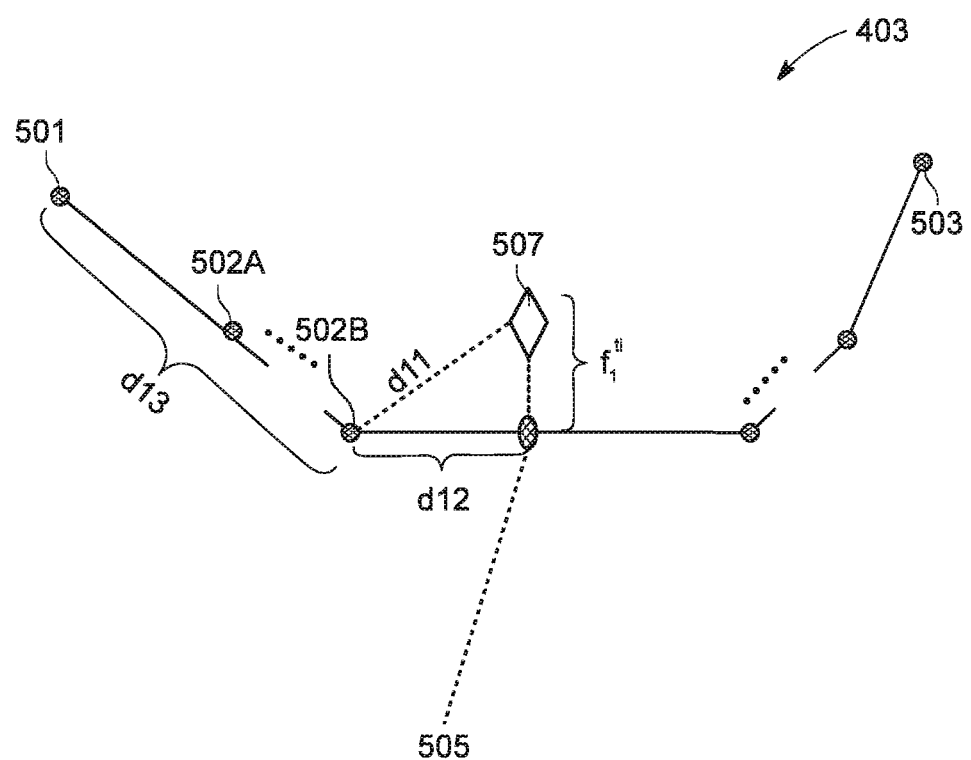
Figure 5B:
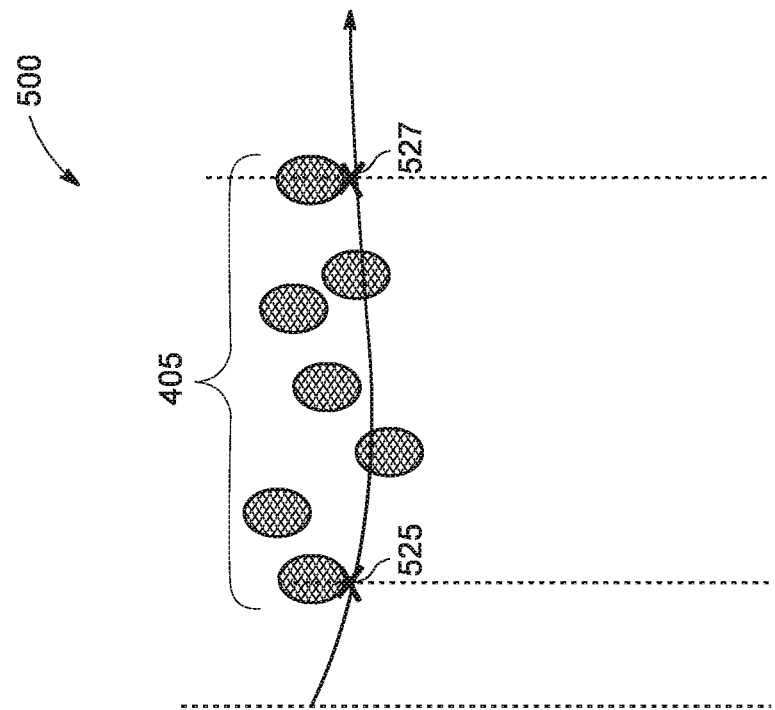
Figure 5B:
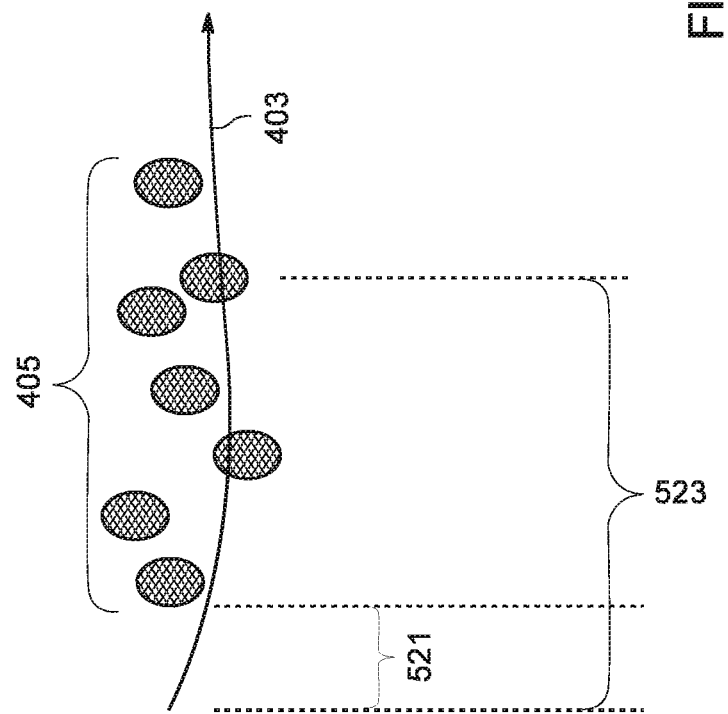
Figure 6:
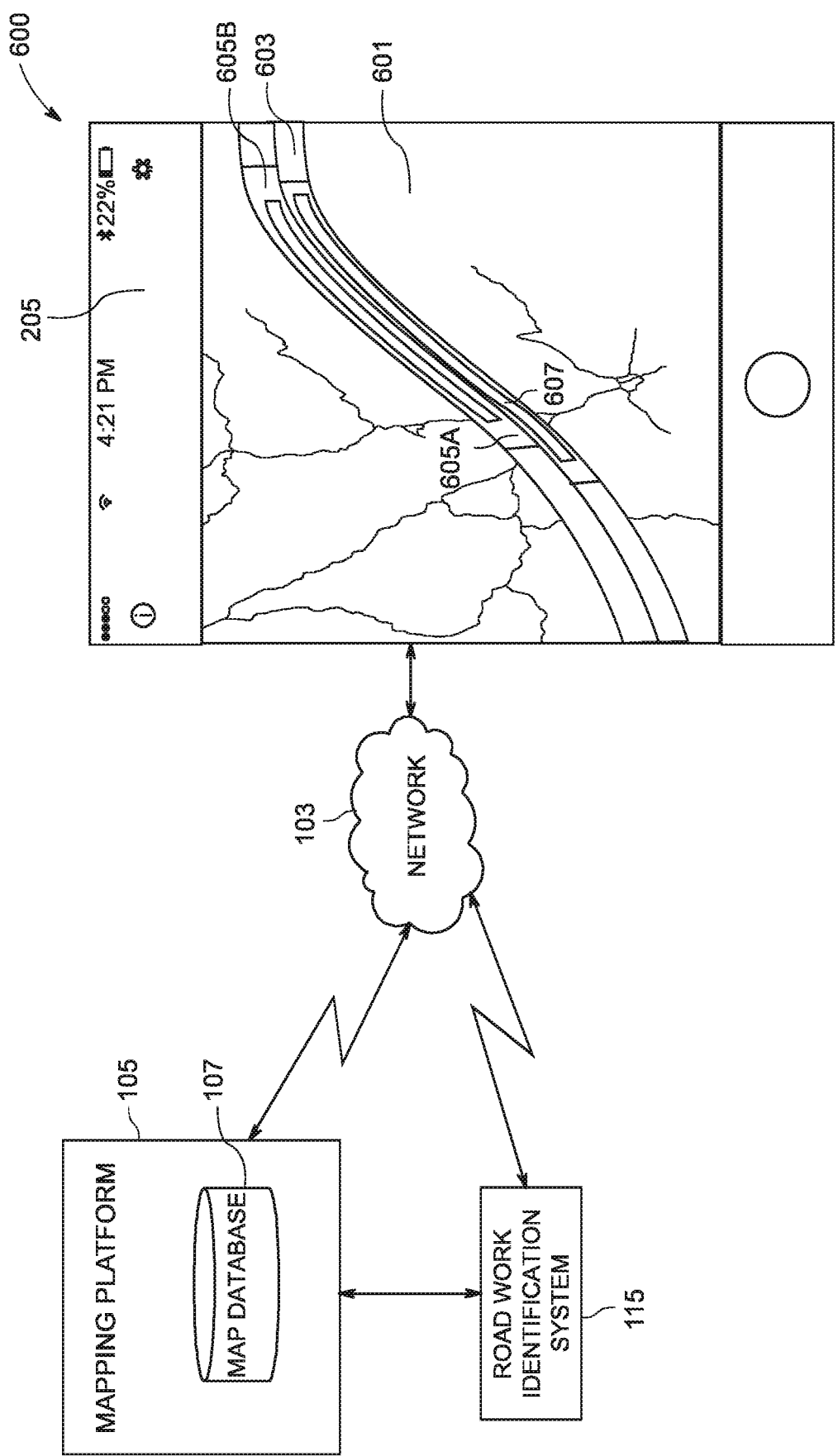
Figure 7:
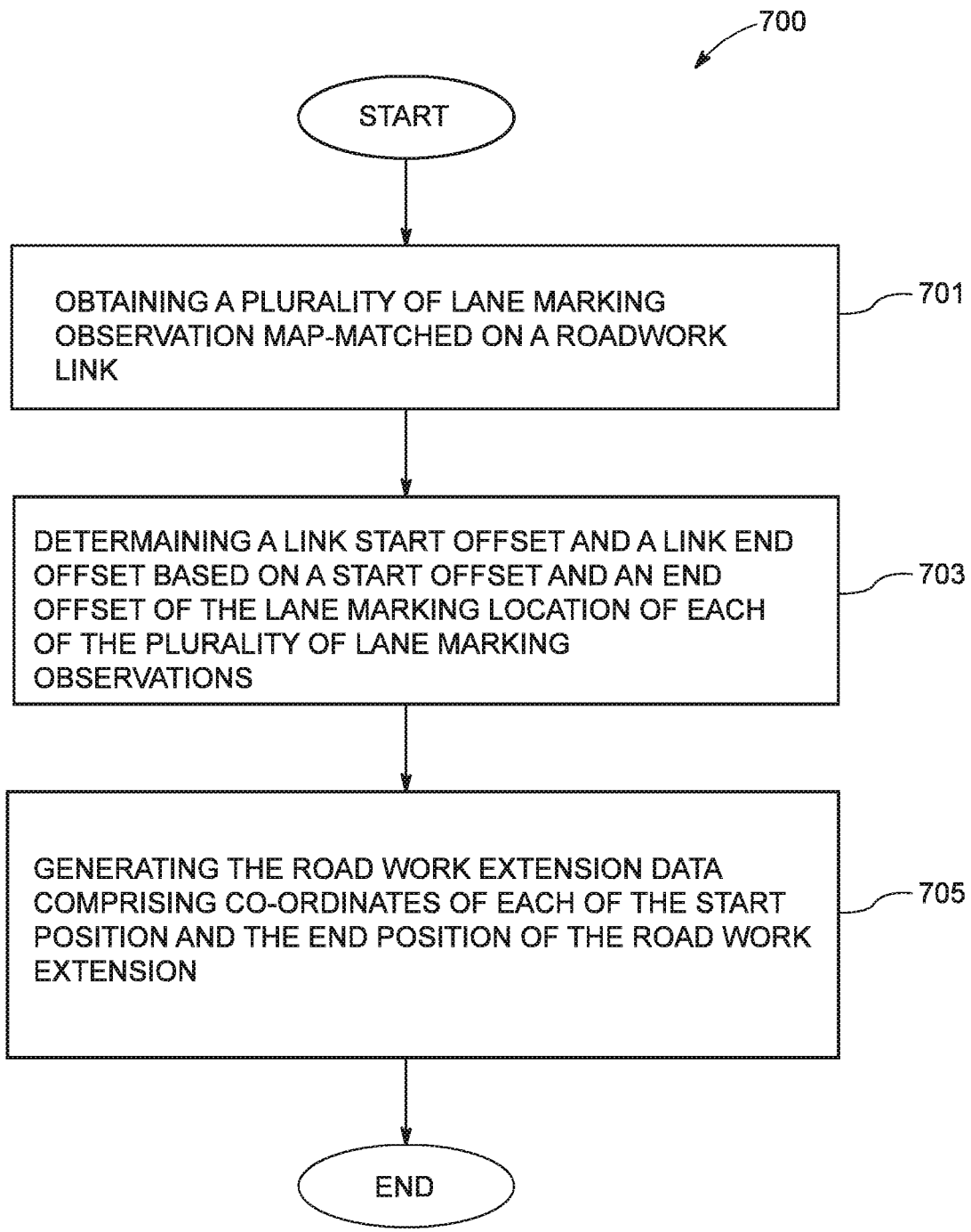

Having thus described example embodiments of the invention in general terms, reference will now be made to the accompanying drawings, which are not necessarily drawn to scale, and wherein:

FIG. 1 illustrates a schematic diagram of an environment describing at least one embodiment of the present disclosure;

FIG. 2 illustrates a schematic representation of an exemplary environment for generation of lane marking observation and processing of the observations to identify road work extensions, in accordance with an example embodiment;

FIG. 3 illustrates a block diagram of a road work identification system for determining road work extension data for identification of at least one road work extension, in accordance with an example embodiment;

FIG. 4 shows a schematic graphical representation of lane markings that are randomly distributed along a link of a geographic location, in accordance with one embodiment;

FIG. 5A illustrates a schematic representation of a road work link section, in accordance with an example embodiment;

FIG. 5B illustrates a schematic drawing of a road work link, representing co-ordinates of each of a start position and an end position of the road work extension corresponding to the road work extension, in accordance with an example embodiment;

FIG. 6 illustrates a schematic representation of a user interface communicatively coupled to a road work identification system in association of FIG. 1, in accordance with an example embodiment; and FIG. 7 illustrates a flow diagram of a method for determining road work extension data for identification of at least one road work extension, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway with a pre-defined length. Examples of the link including, but not limited to, a roadway, a highway, a freeway, an expressway, a lane, a street path, a road, an alley, a controlled access roadway, a free access roadway and the like.

The term 'route' may be used to refer to a path from a source location to a destination location on any link.

The term 'user equipment' may be used to refer to a smart device comprising at least one of a sensor unit, processor and a communication module, wherein the user equipment is adapted to capture lane marking of one or more routes.

End of Definitions

A solution including a method, a system, and a computer program product are provided herein in accordance with at least one example embodiment for identification of at least one road work extension in a geographical location. The solution includes the process of building and accessing a map for the geographic location curated with the marking of one or more road work zones corresponding to the at least one road work extension. The system and method for identifying lane markings using autonomous vehicles are known in the art, however, these systems are based on the method of identifying the lane markings, where the location at which the lane markings are identified is considered as the start point of the road work and the location at which the lane markings disappear will be considered as the end point of the road work. The subsequently mentioned solution provides a system, a method and a computer program product to calculate at least one road work extension by identifying start and end offset of at least one link. The present solution may precisely provide the road work extension data in a graphical representation via user interface, which helps the travelers to plan the travel in advance in accordance with the received road extension data.

The system, method and computer program product facilitating the identification of at least one road work extension (or road work extensions) is described in FIG. 1 to FIG. 7.

FIG. 1 illustrates a schematic diagram of an environment 100 describing at least one embodiment of the present disclosure. User equipment (UE) 101, which may be alternatively referred as a user device 101, is in communication with a mapping platform 105 over a network 103. The network 103 may be wired, wireless, or any combination of wired and wireless communication networks, such as cellular, Wi-Fi, internet, local area networks, communication protocols or the like. In one example, the user equipment 101 may be a navigation system, that may be configured to provide route guidance and navigation related functions to the user of a vehicle 102. In one embodiment, the user equipment 101 may be installed in the vehicle 102 and adapted to capture lane marking data along at least one route (or alternatively referred as 'a route'). Further, the user equipment 101 may include a sensor unit configured to capture at least one lane marking (or lane markings) corresponding to at least one road work indication. In one example, the sensor unit may be a camera, configured to capture images of the lane markings. The lane markings captured by the user equipment 101 may be referred as the lane marking data. Further, in one example, the user equipment 101 is configured to process the capture lane marking data to generate lane marking observations. In one example, the lane marking observations may comprise at least one of an image capture by the user equipment, location of the lane markings, heading of the lane marking and time stamp. In one embodiment, the user equipment 101 may transmit either the captured lane markings or the generated lane marking observations to an Oracle® Enterprise Manager (OEM) cloud sequentially. Alternate to the previous embodiment, the road sign observations may be scheduled to be transmitted to the OEM cloud in batches.

Further, the user equipment 101 may be a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 105 such that the user equipment 101 may provide navigational assistance to the user among other services provided through access to the mapping platform 105.

As exemplarily illustrated, the mapping platform 105 may also include a map database 107, which may store node data, road segment data or link data, point of interest (POI) data, posted signs related data or the like. The map database 107 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles (such as the vehicle 102), for example, cars, trucks, buses, motorcycles, and/or other entities. Optionally, the map database 107 may contain path segment and node data records or other data that may represent pedestrian paths or areas in addition to or instead of the vehicle 102 road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 may include data about the POIs and their respective locations in the POI records. The map database 107 may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 107 may include event data (e.g., traffic incidents, construction activities, scheduled events, unscheduled events, etc.) associated with the POI data records or other records of the map database 107 associated with the mapping platform 105. The map database 107 may additionally include data related to road work, which may alternatively be referred as road work zones, such as, location of the road work zone, diversions to be caused due to the roadwork zones, suggested routes to avoid congestion to be caused due to the roadwork zones, etc. The data related road work zones may be fetched by the road work identification system 115 from external systems, such as, road work planning system of the municipalities. Although the environment 100 of FIG. 1 depicts the mapping platform 105 as separate from the road work identification system, in some example embodiments, the mapping platform 115 may be integrated as a part of the road work identification system 115.

A content provider such as a map developer may maintain the mapping platform 105. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle 102 along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, may be used to generate map geometries directly or through machine learning as described herein.

The map database 107 of the mapping platform 105 may be a master map database stored in a format that facilitates updating, maintenance, and development. For example, the master map database or data in the master map database may be in an Oracle® spatial format or other spatial format, such as for development or production purposes. The Oracle® spatial format or development/production database may be compiled into a delivery format, such as a geographic data files (GDF) format. The data in the production and/or delivery formats may be compiled or further compiled to form geographic database products or databases, which may be used in end user navigation devices or systems. In some embodiments, the map database 107 may be a master geographic database configured at a server side, but in alternate embodiments, a client side map database 107 may represent a compiled navigation database that may be used in or with end user devices (e.g., user equipment 101) to provide navigation, speed adjustment and/or map-related functions to navigate through roadwork zones.

In one embodiment, the user device or the user equipment 101 may be an in-vehicle navigation system of a vehicle 102, such as, an infotainment system, a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user may use the user equipment 101 for navigation and map functions such as guidance and map display, for example, and for determination of one or more personalized routes or route segments based on one or more calculated and recorded routes, according to some example embodiments. In some embodiments, the user of the vehicle 102 may be notified by the mapping platform 105 or the road work identification system 115 about location of the road work zones and the user may use the user equipment 101, for example, the in-vehicle navigation system for navigation and map functions such as guidance and map display, according to some example embodiments. The user equipment 101 may include an application, for example, road work detection application with a user interface that may enable the user to access the mapping platform 105 for availing the functions disclosed above, such as, for navigating through identified roadwork zones on generating at least one route speed funnel. The user equipment 101 may thus be a part of the vehicle 102. Although, the environment 100 depicts a single vehicle 102 and a single user equipment 101, it may be contemplated that within the scope of the present disclosure, a plurality of user equipment and/or vehicles may communicate with the road work identification system 115.

The environment 100 may further include a services platform 109, which may be used to provide navigation related functions and services 111a-111i to the application 203 running on the user equipment 101. The services 111a-111i may include such as navigation functions, speed adjustment functions, traffic related updates, weather related updates, warnings and alerts, parking related services, indoor mapping services and the like. The services 111a-111i may be provided by a plurality of content providers 113a-113k. In some examples, the content providers 113a-113k may access various Software Development Kits (SDKs) from the services platform 109 for implementing one or more services. In an example, the services platform 109 and the mapping platform 105 may be integrated into a single platform to provide a suite of mapping and navigation related applications for OEM devices, such as the user equipment 101. The user equipment 101 may be configured to interface with the services platform 109, the content provider's services 113a-113k, and the mapping platform 105 over a network 103. Thus, the mapping platform 105 and the services platform 109 may enable provision of cloud-based services for the user equipment 101, such as, storing the lane marking observations in the OEM cloud in batches or in real-time.

Further, the user equipment 101, installed in the vehicle 102 is communicatively coupled with a road work identification system 115. The road work identification system 115, which may be alternatively referred to as the system 115, is configured to collect lane markings of at least one route corresponding to at least one road work zone via the network 103. In an alternative embodiment, the system 115 is configured to collect the lane marking observations from one or more user equipment 101 in order to calculate road work extension data corresponding to at least one road work extension. The system 115 may obtain the lane marking observations directly from the one or more user equipment 101/vehicles 102 or from an OEM cloud associated with the one or more vehicles 102/user equipment 101. A system for generating at least one road work observations for at least one link based on the lane markings received from the user equipment is described with reference to FIG. 2.

FIG. 2 illustrates a schematic representation of an exemplary system 200 for generation of lane marking observation and processing of the observations to identify road work extensions, in accordance with an example embodiment. The system 200 includes a user equipment 101, including an application 203 with a user interface 205 for accessing one or more map and navigation related functions. The user equipment 101 may also include a sensor unit 207 with one or more sensors such as a camera, an acceleration sensor, a gyroscopic sensor, a LIDAR sensor, a proximity sensor, a motion sensor, and the like. The sensors unit 207 may primarily be used for detecting road signs and determining positioning of vehicles such as the vehicles 102 of FIG. 1, and the sensor unit 207 may be built-in or embedded into or within interior of the user equipment 101. In some embodiments, the user equipment 101 uses communication signals for position determination. The user equipment 101 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth® based radio maps, or the like. The data collected by the sensor unit 207 may be used to gather information related to an environment of the vehicle, such as, the road work zone. In some embodiments, the vehicle may have sensors positioned on or within and the sensors may provide data indicating a location of the vehicle, heading data associated with lane markings along pathways approaching a road work zone, and any other kinds of lane markings indicating a road work zone that is approaching. The data collected by the sensors may be transmitted to the OEM cloud. Vehicle data, also referred to herein as "probe data", may be collected by any device capable of determining the necessary information, and providing the necessary information to a remote entity. The user equipment 101 is one example of a device that may function as a probe to collect probe data of a vehicle such as the vehicle 102.

More specifically, probe data collected by the user equipment 101 may be representative of the location of the vehicle at a respective point in time and may be collected while the vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The user equipment 101, may be any device capable of collecting the aforementioned probe data.

In one example, a road work identification system 115, which is communicatively coupled to the user equipment 101, is configured to fetch the lane marking observations. The obtained lane marking observation assist in identifying at least one road work extension corresponding to at least one route. From the road work identification system 115, the road work extension data is communicated to the mapping platform 105 similar to the mapping platform exemplarily illustrated in FIG. 1, through the network 103. The lane marking observations for a road work zone identification corresponding to at least one to the road work extension assist the vehicle (such as the vehicle 102) to navigate through the roadwork zone. The processing of the lane marking observations to generate a start offset and end offset for at least one link is performed by a processor disposed within the road work identification system 115, exemplarily illustrated in FIG. 3.

FIG. 3 illustrates a block diagram 300 of a road work identification system 115, which may be alternatively referred as the system 115, for determining road work extension data for identification of at least one road work extension, in accordance with an example embodiment of the present invention. The system 115 may comprise at least one memory 307 (or a memory 307) configured to store computer program code instructions and at least one processor 303 (or a processor 303) configured to execute the computer program code instructions. Additionally, the system 115 may further comprise a data communication module 301 and a user interface module 305. In the embodiments described herein, the processor 303 is further configured to execute the stored computer program code instructions fetched from the memory 307. It may be contemplated that fewer or greater number of modules may be utilized within the scope of this disclosure to execute the various functionalities described herein.

The processor 303 may be embodied in a number of different ways. For example, the processor 303 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 303 may include one or more processing cores configured to perform independently. A multi-core processor may enable multiprocessing within a single physical package. Additionally or alternatively, the processor 303 may include one or more processors configured in tandem via the bus to enable independent execution of instructions, pipelining and/or multithreading.

Additionally or alternatively, the processor 303 may include one or processors capable of processing large volumes of workloads and operations to provide support for big data analysis. In an example embodiment, the processor 303 may be in communication with a memory 307 via a bus for passing information among components of the system 115. The memory 307 may be non-transitory and may include, for example, one or more volatile and/or non-volatile memories. In other words, for example, the memory 307 may be an electronic storage device (for example, a computer readable storage medium) comprising gates configured to store data (for example, bits) that may be retrievable by a machine (for example, a computing device like the processor 303). The memory 307 may be configured to store information, data, content, applications, instructions, or the like, for enabling the apparatus to carry out various functions in accordance with an example embodiment of the present invention. For example, the memory 307 could be configured to buffer input data for processing by the processor 303. As exemplarily illustrated in FIG. 3, the memory 307 could be configured to store instructions for execution by the processor 303. As such, whether configured by hardware or software methods, or by a combination thereof, the processor 303 may represent an entity (for example, physically embodied in circuitry) capable of performing operations according to an embodiment of the present invention while configured accordingly. Thus, for example, when the processor 303 is embodied as an ASIC, FPGA or the like, the processor 303 may be specifically configured hardware for conducting the operations described herein. Alternatively, as another example, when the processor 303 is embodied as an executor of software instructions, the instructions may specifically configure the processor 303 to perform the algorithms and/or operations described herein when the instructions are executed. However, in some cases, the processor 303 may be a processor specific device (for example, a mobile terminal or a fixed computing device) configured to employ an embodiment of the present invention by further configuration of the processor 303 by instructions for performing the algorithms and/or operations described herein. The processor 303 may include, among other things, a clock, an arithmetic logic unit (ALU) and logic gates configured to support operation of the processor 303.

In some embodiments, the processor 303 may be configured to provide Internet-of-Things (IoT) related capabilities to users of the system 115 disclosed herein. The IoT related capabilities may in turn be used to provide smart city solutions by providing real time parking updates, big data analysis, and sensor based data collection by using the cloud based mapping platform 105 of FIG. 1 for providing navigation and parking recommendation services and roadwork zone identification services. In some embodiments, the mapping platform 105 may be configured to provide an environment for development of parking strategy recommendation solutions for navigation systems in accordance with the embodiments disclosed herein. The environment may be accessed using the user interface module 305 of the system 115 disclosed herein. The user interface module 305 may provide an interface for accessing various features and data stored in the system 115.

In one embodiment, the data communication module 301 communicates with the sensor unit 207 disclosed in the detailed description of FIG. 2 and may receive lane marking observations corresponding to lane markings of at least one link from the sensor unit 207. In an alternative embodiment, the data communication module 301 may receive the lane marking observations from the OEM cloud over the network 103 as described in FIG. 2. In some example embodiments, the data communication module 301 may also receive destination information of a user of a vehicle such as the vehicle 102 via the network 103. The lane marking observations comprise time of capture of the lane markings from the vehicle 102 as a time stamp associated with each of the lane marking observations. A plurality of vehicles, such as, 102 passing by the location of each of the lane markings corresponding to at least one road work zone (suggesting at least one road work extension) on the pathway, generate a plurality of lane marking observations for each of the lane markings. Thus, each lane marking observation is different from other lane marking observation based on location data, heading data, and time of capture of the lane marking from a respective vehicle. The data communication module 301 may receive sensor data configured to describe a position of the user equipment 101 installed in the vehicle 102, or a controller of the user equipment 101 may receive the sensor data from the positioning system of the user equipment 101. In one example, the graphical user interface representation of the lane marking data collected from multiple vehicles, such as the vehicle 102 may be represented as shown in the FIG. 4.

FIG. 4 shows a schematic graphical representation 400 of lane markings 405 that are randomly distributed along a road work link 401 of a geographic location 402, in accordance with one embodiment of the invention. The processor 303 is configured to fetch a plurality of lane marking observations corresponding to plurality of lane marking 405, where the plurality of lane marking observations are map-matched on the road work link 401. In one embodiment, each of the lane marking observations associated with the lane marking 405 comprises a lane marking location, where the location (or alternatively, location co-ordinates) of the lane marking 405 is map-matched with the location of the road work link 401 stored in the map database 107 of FIG. 1. Additionally, the lane marking observations may further comprise a lane marking heading. In one example, the lane marking heading may be defined as a clock-wise degree difference between lane marking direction and due north direction. Further, the lane marking heading may be of two categories, namely, link upstream heading, where the heading of the start location of the link 401, measured as the clock-wise degree between the traffic sign and due north and link downstream heading, where the heading of the end location of the link, measured as the clock-wise degree between the traffic sign and due north.

In one example, for the ease of explanation, let us as consider a section of road work link 401, which may be referred as road work link section 403 containing plurality of lane marking observation corresponding to the lane markings 405. Further, according to one aspect of the invention, the road work link 401 or the road work link section 403 may comprise a start node, an end node and plurality of shape nodes which is described using an exemplary embodiment in FIG. 5A.

FIG. 5A illustrates a schematic representation of a road work link section 403, in accordance with an example embodiment of the invention. The processor 303 selects a section of lane marking 403 or a link section 403 of the road work link and fetches the lane marking observations of the link section 403. In a preferred embodiment, the line section 403 represents a beginning of the road work of a link 401 of FIG. 4. In one embodiment, the road work link section 403 may correspond to the road work link 401 and hence the road work link section 403 may be alternatively referred as the road work link 401.

Further, in accordance with FIG. 3, the processor 303 determines a link start offset and a link end offset (as shown in FIG. 5B) based on a start offset and an end offset of location of the lane marking 405 of each of the plurality of lane marking observations. In an exemplary embodiment, consider a start node 501, an end node 503 and plurality of shape nodes such as node 502A, 502B. In one embodiment, the processor 303 is configured to determine the distance between lane marking location of each of the plurality of lane marking observations, such as lane marking location 507 and each of the plurality of shape points (502A, 502B), on the road work link 403. In one example, the shape point with the shortest distance from a lane marking location may be selected as a target shape point, 502B, which in one example referred as '$t_i$'.

Further, in one embodiment, processor 303 is configured to determine an on-route distance between the selected target shape point 502B and the lane marking location 507 of each of the plurality of lane marking observations. The distance between the selected target shape point 502B and the lane marking location 507 of at least one of the plurality of lane marking observations may be represented by '$d_{11}$', as shown in FIG. 5A. Further, the processor 303 is configured to determine the point to line distance between the lane marking location 507 and a node 505 on the road work link 403. The distance between the lane marking location 507 and the node 505 on the road work link 403 at may be represented by '$f_1^{ti}$'. Furthermore, on-route distance may be calculated from the lane marking location 507 of at least one of the plurality of lane marking observations, in one example, using the Pythagorean Theorem. Accordingly, the theorem quotes:

$$d_{12} = \sqrt{(d_{11})^2 - (f_1^{ti})^2}.$$

In one embodiment, post the calculation of '$d_{12}$', the on-route distance is calculated in the upstream of the road work link 403. The start offset of the lane marking location 507 of each of the plurality of lane marking observations is determined based on the determined on-route distance and a location of the start node 501 of the road work link 403. In one example, a start offset of the lane marking location of each of the plurality of the lane marking observations is calculated by the summation of '$d_{12}$' with that of the distance from the start node 501 to another shape point on the road work link 403, which may be represented by '$d_{13}$'. Similarly, an end offset of the lane marking location 507 of each of the plurality of lane marking observations based on the determined start offset and a location of the end node 503 of the roadwork link 403. Further, the processor 303 is configured to extracting a link start offset and a link end offset based on the determined start offset and the determined end offset of the lane marking location 507 of each of the plurality of lane marking observations.

According to one aspect of the invention, the smallest distance extracted from the start offset and the end offset of the lane marking location 507 of each of the plurality of lane marking observations is specified as the link start offset and largest distance start extracted from the start offset and the end offset of the lane marking location 507 of each of the plurality of lane marking observations is specified as the link end offset. In one embodiment, the link start offset is associated with a start position of the road work extension and the link end offset is associated with an end position of the road work extension. Further, the processor 303 is configured to extract a pair of location co-ordinates associated with the target shape point 505 on the roadwork link 403 based on the link start offset and the link end offset. A pictorial representation of schematic drawing of a road work link representing co-ordinates of each of a start position and an end position of the road work extension corresponding to the road work extension is described in FIG. 5B.

That is, FIG. 5B illustrates a schematic drawing 500 of a road work link 403 representing co-ordinates (525, 527) of each of a start position and an end position of the road work extension corresponding to the road work extension, in accordance with an example embodiment. The processor 303, further configured to generate road work extension data based on the obtained link start offset and the link end offset such as the link start offset 521 and the link end offset 523 as represented in FIG. 5B. In one example, to generate the road work extension data, the processor 303 is configured to search for a pair of co-ordinates associated with the target shape point 505 (of FIG. 5A) on the roadwork link 403 and thus determine the link start offset co-ordinate 525 and the link end offset co-ordinate 527 based on a location of the target shape point 505 and a location of a candidate shape point (not shown in any figures) on the roadwork link 403 in downstream of the target shape point 505. In one example, the candidate shape point may be any shape point on the road work link 403 downstream the target shape point 505.

Further, in one embodiment, the co-ordinates of each of the start position and the end position (525, 527) of the road work extension (or the road work link 403) correspond to a longitudinal component and a latitudinal component associated with a location of the road work extension. A graphical representation of the road work extension displayed on a user equipment is shown in FIG. 6. In one example, the user equipment may be the user equipment 101 of FIG. 2, which is configured with an application 203 and a user interface 205 that is configured to fetch graphical representation of a map of at least one location curated with road work extension data of the at least one location, from the system 115 in association with the mapping platform 105.

FIG. 6 illustrates a schematic representation 600 of a user interface 205 on a user equipment (such as 101), communicatively coupled to a road work identification system 115 in association with the mapping platform 105 containing map database 107, in accordance with an example embodiment. Accordingly, the user interface shows a graphical representation of a location 601 curated with road work extension data of a route 603 (or alternatively be called as a link). In one example, the road work extension data shows a start link offset 605A and an end link offset 605B and a road work extension 607.

The road work extension data may be streamed from the road work identification system 115 in association with a mapping platform 105 through a network 103. In some example embodiments, the processor 303 (of FIG. 3) may be configured to provide a method for determining road work extension data for identification of at least one road work extension as will be discussed in conjunction with FIG. 7 as below.

Accordingly, FIG. 7 illustrates a flow diagram of a method 700 for determining road work extension data for identification of at least one road work extension, in accordance with an example embodiment of the present invention. It will be understood that each block of the flow diagram of the method 700 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 307 of the road work identification system 115 of FIG. 3, employing an embodiment of the present invention and executed by a processor 303 of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 307 that may direct a computer or other programmable apparatus to function in a particular manner, such that the instructions stored in the computer-readable memory 307 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 700, at 701, includes a step of obtaining a plurality of lane marking observations map-matched on a roadwork link, wherein each of the lane marking observations comprise a lane marking location. At 703, the method 700 includes steps of determining a link start offset and a link end offset based on a start offset and an end offset of the lane marking location of each of the plurality of lane marking observations, wherein the link start offset is associated with a start position of the road work extension and the link end offset is associated with an end position of the road work extension and, at 705, generating the road work extension data comprising co-ordinates of each of the start position and the end position of the road work extension, based on the determined link start offset and the link end offset.

In an example embodiment, a system for performing the method of FIG. 7 above may comprise a processor (e.g. the processor 303) configured to perform some or each of the operations (701-705) described above. The processor may, for example, be configured to perform the operations (701-705) by performing hardware implemented logical functions, executing stored instructions, or executing algorithms for performing each of the operations. Alternatively, the system may comprise means for performing each of the operations described above. In this regard, according to an example embodiment, examples of means for performing operations 701-705 may comprise, for example, the processor 303 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for determining road work extension data for identification of at least one road work extension, the method comprising:
    obtaining a plurality of lane marking observations map-matched on a roadwork link, wherein each of the lane marking observations comprise a lane marking location;
    determining, by a processor, a start offset and an end offset of the lane marking location of each of the plurality of lane marking observations, wherein the start offset is determined based on on-route distance and a location of a start node of the roadwork link; and wherein the end offset is determined based on the start offset and a location of an end node of the roadwork link;
    determining, by the processor, a link start offset, and a link end offset based on the start offset and the end offset of the lane marking location of each of the plurality of lane marking observations, wherein the link start offset is associated with a start position of the road work extension and the link end offset is associated with an end position of the road work extension;
    generating by the processor, the road work extension data comprising co-ordinates of each of the start position and the end position of the road work extension, based on the determined link start offset and the link end offset; and
    displaying by a user interface, the road work extension data to a user.

2. The method of claim 1, wherein each of the plurality of lane marking observations further comprises a lane marking heading.

3. The method of claim 1, wherein the roadwork link further comprises a plurality of shape points.

4. The method of claim 3, wherein the determining of the link start offset and the link end offset comprises:
    selecting a target shape point from the plurality of shape points on the roadwork link based on a distance between the lane marking location of each of the plurality of lane marking observations and each of the plurality of shape points on the roadwork link, wherein the target shape point from the plurality of shape points has a shortest distance from the lane marking location of at least one of the plurality of lane marking observations; and
    determining the on-route distance between the selected target shape point and the lane marking location of each of the plurality of lane marking observations.

5. The method of claim 4, wherein the generating of the road work extension data comprises:
    searching for a pair of co-ordinates associated with the target shape point on the roadwork link; and
    determining the co-ordinates of each of the link start offset and the link end offset based on a location of the target shape point and a location of a candidate shape point on the roadwork link in downstream of the target shape point.

6. The method of claim 1, wherein the co-ordinates of each of the start position and the end position of the road work extension correspond to a longitudinal component and a latitudinal component associated with a location of the road work extension.

7. A system for determining road work extension data for identification of at least one road work extension, the system comprising:
    at least one memory configured to store computer program code instructions; and
    at least one processor configured to execute the computer program code instructions to:
        obtain a plurality of lane marking observations map-matched on a roadwork link, wherein each of the lane marking observations comprise a lane marking location;
        determine a start offset and an end offset of the lane marking location of each of the plurality of lane marking observations, wherein the start offset is determined based on on-route distance and a location of a start node of the roadwork link; and wherein the end offset is determined based on the start offset and a location of an end node of the roadwork link;
        determine a link start offset and a link end offset based on the start offset and the end offset of the lane marking location of each of the plurality of lane marking observations, wherein the link start offset is associated with a start position of the road work extension and the link end offset is associated with an end position of the road work extension;
        generate the road work extension data comprising co-ordinates of each of the start position and the end position of the road work extension, based on the determined link start offset and the link end offset; and
        display by a user interface, the road work extension data to a user.

8. The system of claim 7, wherein each of the plurality of lane marking observations further comprises a lane marking heading.

9. The system of claim 7, wherein the roadwork link further comprises a plurality of shape points.

10. The system of claim 9, wherein to determine the link start offset and the link end offset, the at least one processor is further configured to:
    select a target shape point from the plurality of shape points on the roadwork link based on a distance between the lane marking location of each of the plurality of lane marking observations and each of the plurality of shape points on the roadwork link, wherein the target shape point from plurality of shape points has a shortest distance from the lane marking location of at least one of the plurality of lane marking observations; and determine the on-route distance between the selected target shape point and the lane marking location of each of the plurality of lane marking observations.

11. The system of claim 10, wherein to generate the road work extension data the at least one processor is further configured to:

search for a pair of co-ordinates associated with the target shape point on the roadwork link; and determine the co-ordinates of each of the link start offset and the link end offset based on a location of the target shape point and a location of a candidate shape point on the roadwork link in downstream of the target shape point.

12. The system of claim 7, wherein the co-ordinates of each of the start position and the end position of the road work extension correspond to a longitudinal component and a latitudinal component associated with a location of the road work extension.

13. A computer program product comprising at least one non-transitory computer-readable storage medium having stored thereon computer-executable program code instructions which when executed by a computer, cause the computer to carry out operations for determining road work extension data for identification of at least one road work extension, the operations comprising:

obtaining a plurality of lane marking observations map-matched on a roadwork link, wherein each of the lane marking observations comprise a lane marking location;

determining, by a processor, a start offset and an end offset of the lane marking location of each of the plurality of lane marking observations, wherein the start offset is determined based on on-route distance and a location of a start node of the roadwork link; and wherein the end offset is determined based on the start offset and a location of an end node of the roadwork link;

determining, by the processor, a link start offset and a link end offset based on the start offset and the end offset of the lane marking location of each of the plurality of lane marking observations, wherein the link start offset is associated with a start position of the road work extension and the link end offset is associated with an end position of the road work extension;

generating by the processor, the road work extension data comprising co-ordinates of each of the start position and the end position of the road work extension, based on the determined link start offset and the link end offset; and displaying by a user interface, the road work extension data to a user.

14. The computer program product of claim 13, wherein each of the plurality of lane marking observations further comprises a lane marking heading.

15. The computer program product of claim 13, wherein the roadwork link further comprises a plurality of shape points.

16. The computer program product of claim 15, wherein the determining of the link start offset and the link end offset comprises:

selecting a target shape point from the plurality of shape points on the roadwork link based on a distance between the lane marking location of each of the plurality of lane marking observations and each of the plurality of shape points on the roadwork link; and determining the on-route distance between the selected target shape point and the lane marking location of each of the plurality of lane marking observations.

17. The computer program product of claim 16, wherein the generating of the road work extension data comprises:

searching for a pair of co-ordinates associated with the target shape point on the roadwork link; and determining the co-ordinates of each of the link start offset and the link end offset based on a location of the target shape point and a location of a candidate shape point on the roadwork link in downstream of the target shape point.

* * * * *